United States Patent
Arnold et al.

(10) Patent No.: US 8,024,788 B2
(45) Date of Patent: Sep. 20, 2011

(54) METHOD AND APPARATUS FOR RELIABLE, HIGH SPEED DATA TRANSFERS IN A HIGH ASSURANCE MULTIPLE LEVEL SECURE ENVIRONMENT

(75) Inventors: Steven L. Arnold, Kirkland, WA (US); Thomas E. Donofrio, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1098 days.

(21) Appl. No.: 11/809,262

(22) Filed: May 31, 2007

(65) Prior Publication Data

US 2008/0301799 A1     Dec. 4, 2008

(51) Int. Cl.
*G06F 9/00*     (2006.01)
*H04L 29/06*     (2006.01)

(52) U.S. Cl. .......................................... 726/14; 713/151
(58) Field of Classification Search ..................... 726/14; 713/151
See application file for complete search history.

(56) References Cited

U.S. PATENT DOCUMENTS

| | | | |
|---|---|---|---|
| 6,108,787 A * | 8/2000 | Anderson et al. | 726/5 |
| 6,351,817 B1 * | 2/2002 | Flyntz | 726/4 |
| 6,718,385 B1 * | 4/2004 | Baker et al. | 709/225 |
| 2002/0112181 A1 * | 8/2002 | Smith | 713/201 |
| 2003/0026424 A1 * | 2/2003 | McGarrahan et al. | 380/255 |
| 2003/0105979 A1 * | 6/2003 | Itoh et al. | 713/201 |
| 2003/0196108 A1 * | 10/2003 | Kung | 713/200 |
| 2005/0033990 A1 * | 2/2005 | Harvey et al. | 713/201 |
| 2005/0044407 A1 * | 2/2005 | Marquis et al. | 713/201 |
| 2006/0085862 A1 * | 4/2006 | Witt et al. | 726/26 |
| 2006/0098649 A1 * | 5/2006 | Shay | 370/389 |
| 2007/0182983 A1 * | 8/2007 | Wyatt et al. | 358/1.15 |
| 2007/0204337 A1 * | 8/2007 | Schnackenberg et al. | 726/11 |

* cited by examiner

*Primary Examiner* — Techane Gergiso
(74) *Attorney, Agent, or Firm* — Gates & Cooper LLP

(57) ABSTRACT

A method and apparatus for passing data from a first application at a first security level to a second application in a second security level higher than the first security level is disclosed. A backchannel communications link is established between the first application and the second application, and the backchannel link is used to transmit information such as an acknowledgement message from the second application to the first application.

20 Claims, 6 Drawing Sheets

METHOD AND APPARATUS FOR RELIABLE, HIGH SPEED DATA TRANSFERS IN A HIGH ASSURANCE MULTIPLE LEVEL SECURE ENVIRONMENT

CROSS-REFERENCE TO RELATED APPLICATIONS

This application is related to U.S. patent application Ser. No. 11/810,914, entitled "METHOD AND APPARATUS FOR EXECUTING WEB SERVICES THROUGH A HIGH ASSURANCE GUARD," by David Chazin, filed Jun. 7, 2007, which application is hereby incorporated by reference.

BACKGROUND

1. Technical Field

The present disclosure relates to systems and methods for the transmission and reception of data, and in particular to a system and method for transmitting data from a lower security domain to a higher security domain.

2. Description of the Related Art

The dissemination and processing of data is one of the key characteristics of the information age. Data can be categorized in a number of different ways, but one of the important data classifications involves how widely the data is permitted to be disseminated. For example, it has long been the case in military-related matters that data be unclassified (for general dissemination), confidential (not generally disseminated, but no harm to national security if disseminated), secret (dissemination would harm national security), and top secret (dissemination would do grave harm to national security).

As shown in FIG. 1, only a small amount of the data needed by Department of Defense (DoD) decision makers is classified (e.g. not "unclassified"). However, most of the decision making is done in middle and higher security domains (e.g. Secret or Top Secret). The challenge then is to rapidly, reliably and with high assurance move the data from the security domains were it is created (in most cases unclassified) to the security domains were it is needed by the decision makers.

In the past data was moved between security domains via "sneaker" net in which the data was copied to some medium (i.e. paper, disk) and hand carried by a person between security domains. This was obviously slow and therefore, to no surprise, resulted in the data being somewhat obsolete when it got to where it was to be used, requiring the decision makers to make decisions with less than optimum data. It was not possible to have a common operation picture between the various security domains. It also resulted in excessive data of lower classifications having to be maintained or destroyed in the high classification domains.

While it is possible to share information between computers of different security levels, current systems for accomplishing this task are unacceptably slow. One of the reasons for the slow transfer of data is inherent to the security protocol of MLS systems. For security purposes, such systems typically enforce a one way data transfer (e.g. data is passed from the system at the lower security level to the system at the upper security level, but no data or information whatsoever is returned). Since no confirming data is provided, the sender does not know which packets were successfully transmitted and received, and multiple attempts to deliver the messages often results.

FIG. 2 illustrates another solution to this problem, as demonstrated in Coalition Warfighter Interoperability Demonstration (CWID) 2005. This system 200 comprises one or more computer system(s) providing an Internet access point 202 and plurality of domains 204A-204C of different security classifications. Each domain may include a plurality of computers, communicating via a network such as local area network (LAN). In the illustrated example, the domains 204A-204C include an unclassified domain 204A, a secret domain 204B which has a security classification or level above that of the unclassified domain 204A, and a top secret domain 204C that is characterized by a security classification or level above that of both the unclassified domain 204A and the secret domain 204B.

One or more data diode(s) 212, 214 are used to move large amounts of data segments from the lower classification domains to the higher domains. Data diodes 212, 214 are devices which provide data in one direction (here, from a lower classification domain to a higher classification domain) but do not provide any data whatsoever in the other direction (from higher classification domain to a lower classification domain). For example, data diode 212 moves data from an Internet access point 202 to the unclassified domain 204A and data diode 214 moves data from the Internet access point 202. However, data diode 212 does not permit the communication of data from the unclassified domain 204A to the Internet access point 202, nor does data diode 214 permit the communication of data from the top-secret domain 204C to the Internet Access Point 202.

The system 200 also includes a high assurance data guard/downgrader 210, which is coupled between domains 204 of different classification. When so configured, the data guard/downgrader 210 provides for bi-directional movement of smaller data segments between domains (e.g. unclassified domain 204A and the secret/top secret domains 204B and 204C).

While this system 200 facilitated the movement of data between security domains closer to near real time than sneaker net, it required one or more expensive data diode 214, 216 for each security domain pairs to be interconnected (two in the example shown in FIG. 2) and each data diode 214, 216 must be manually tuned (i.e. slowed) on installation to minimize packet loss by the data diode 214, 216 during use. Because the data diode 214, 216 is a one way communication channel, it uses User Data Protocol (UDP)-like communications that is unreliable because the receiver of the data can not communicate with the sender of the data. For this reason if, unfortunately, a data packet was missed or dropped by the high (classification) side receiver, there is no way for it to notify the low (classification) side sender, thus the high side decision maker might be working with incomplete or erroneous data.

What is needed is a system and method that reduces the cost of data sharing between security domains, while, at the same time, improving the reliability of data sharing in a Multi Level Secure (MLS)/Multiple Independent Levels of Security (MILS) environment. The system and method described herein satisfies this need.

SUMMARY

To address the requirements described above, this document discloses a method, apparatus for passing data from a first application at a first security level to a second application in a second security level higher than the first security level. In one embodiment, the method comprises the steps of establishing an upchannel communications link from the first application to the second application via data guard, the upchannel communications link complying with a user datagram protocol (UDP), establishing a backchannel communications link from the second application to the first application via the data guard, the backchannel communications link complying with a transmission control protocol (TCP), sending a first transmission having a first portion of the data from the first application to the second application via the upchannel communications link, transmitting an acknowledgement message from the second application to the first application via the backchannel link, receiving the first acknowledgement message in the first application, the first acknowledgement message comprising information describing the reception of the first portion of the data, and sending a second transmission of the data according to the received first acknowledgement message.

In another embodiment, the apparatus comprises a first computer, for performing processing at a first security level, a second computer, coupled to the first computer via a data guard, the second computer for performing processing on a second security level higher than the first security level, a first application, operating on the first computer, for establishing an upchannel communications link from the first application to the second application via the data guard, the upchannel link complying with a user datagram protocol (UDP), a second application, operating on the second computer, for establishing a backchannel communications link from the second application to the first application via the data guard, the backchannel communications link complying with a transmission control protocol (TCP), wherein the first application sends a first transmission having a first portion of the data to the second application via the upchannel communications link, wherein the second application transmits an acknowledgement message to the first application via the backchannel link, the acknowledgement message comprising information describing the reception of the first portion of the data by the second application, and wherein the first application sends a second transmission of the data according to the received first acknowledgement message.

The foregoing apparatus and method provides a number of advantages heretofore unknown in the art. It provides a reliable high assurance communications channel that allows for the receiving application executing in a high security domain to communicate to the sending application executing in a lower security domain. This backchannel communications link is used to indicate the successful receipt of data packets, to throttle (slow down) the sending application and to request that the sending application re-send missed data packets. This eliminates the need for multiple copies of expensive data diode hardware, and instead replacing such hardware with functionality existing in the high assurance MLS dataguard/downgrader hardware. In this way, reliability is inexpensively added to the typically unreliable uplink of data from lower security domains to higher security domains.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments. It is understood that other embodiments may be utilized and structural changes may be made without departing from the scope of the present disclosure.

Figure 1:
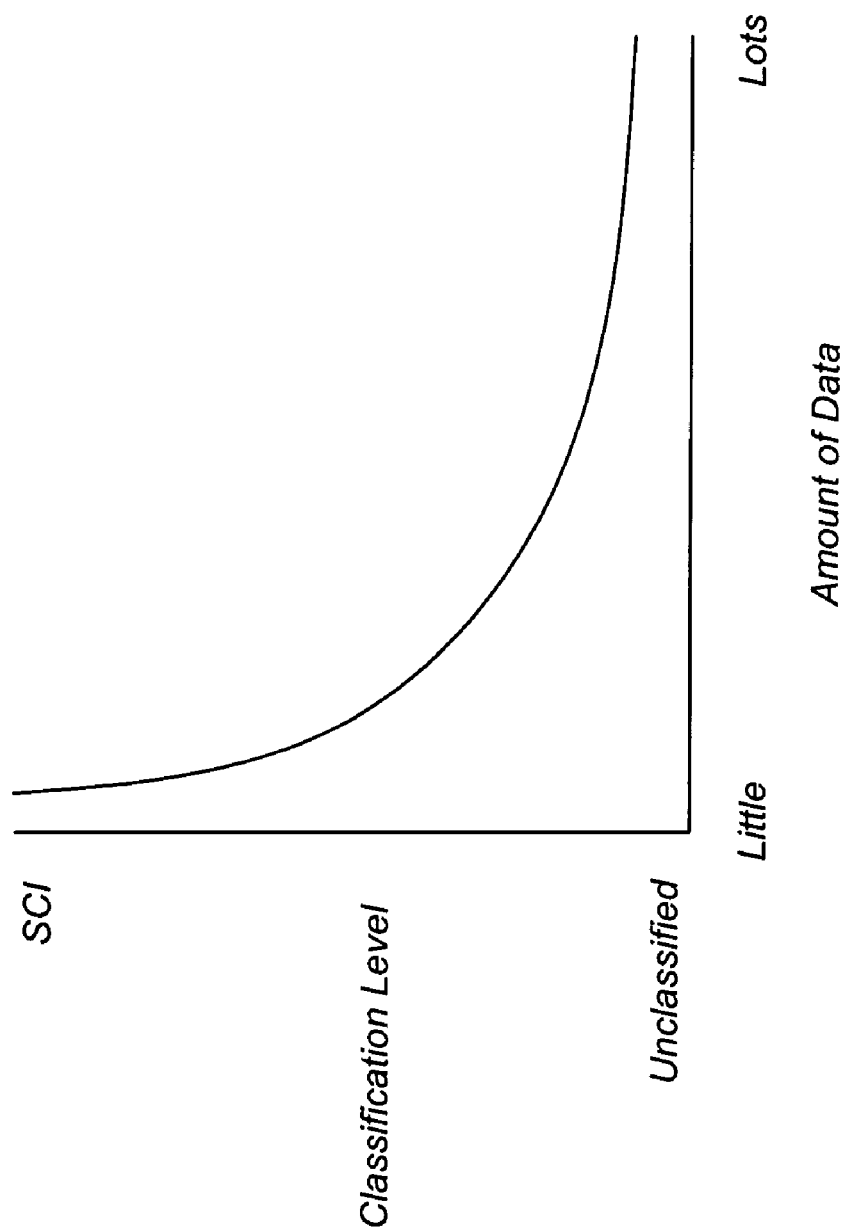
FIG. 1 is a diagram showing the relationship between the amount of data and the its classification level.
Figure 2:
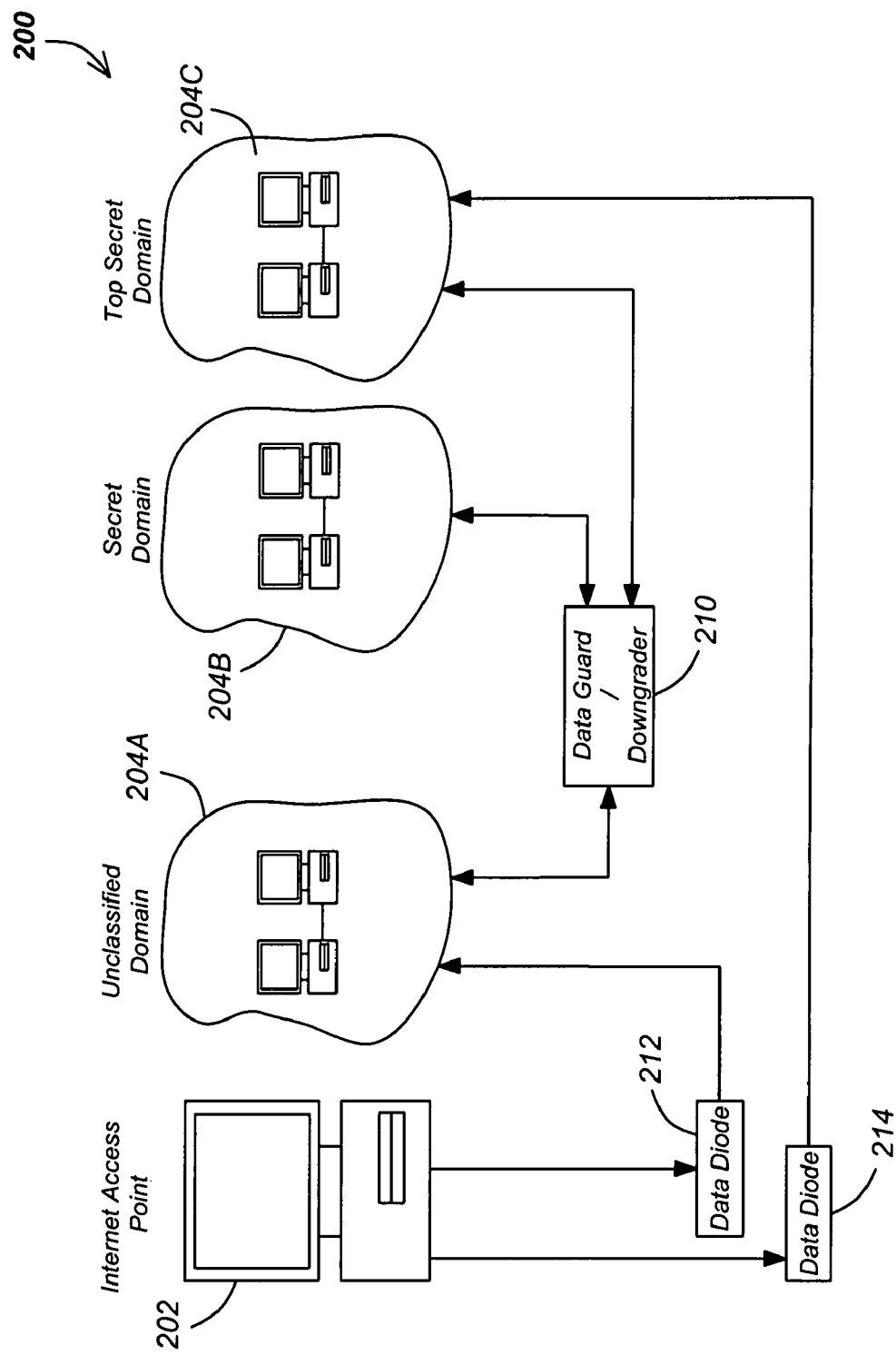
FIG. 2 is a diagram of a CWID data transfer system.
Figure 3:
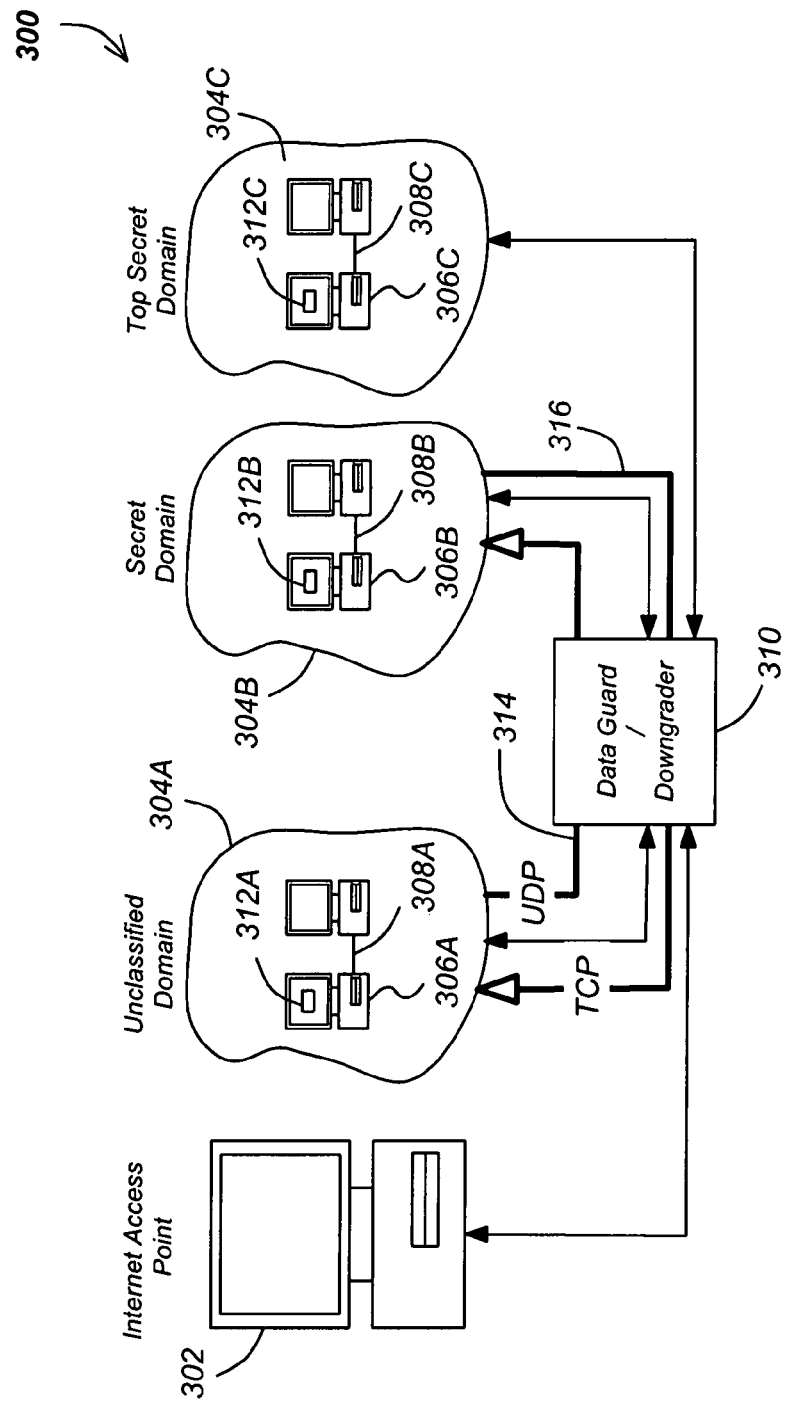
FIG. 3 is a diagram of an improved system for transferring data from one security domain to another.

FIG. 3 is a diagram illustrating a high assurance MLS architecture (HAMLS) 300. The HAMLS includes an optional Internet access point 302 and a plurality of domains 304A-304C. The Internet access point 302 and domains 304A-304C (hereinafter collectively referred to as domains 304) are typically implemented by a system of one or more computers 306A-306C (hereinafter collectively referred to as computers 306), which may be interconnected by respective networks 308A-308C. For example, while the internet access point 302 is illustrated as a single computer system, the unclassified, secret, and top secret domains 304A, 304B, and 304C may comprise a plurality of computers, interconnected in a local area network (LAN) or a wide area network (WAN).

The one or more of the computers in each domain 304 may implement one or more applications 312A-312C (hereinafter collectively referred to as applications 312) that share data with other computers and/or applications. These applications 312 may be third party applications running in the operating memory of the associated computer system 304, or may be applications resident in the associated computer system 304 itself. Internet access point 302 may also comprise a network of one or more computers, one or more of which may implement an application by which data is shared with applications 312 implemented in other computers 306.

As illustrated, the computers 306 in each of the domains 304 (and hence, the applications 312 implemented by the computers 306 within those domains 304) operate at different security levels or domains. The domains 304 and the Internet access point 302 are interconnected via a data guard/downgrader 310.

Figure 4:
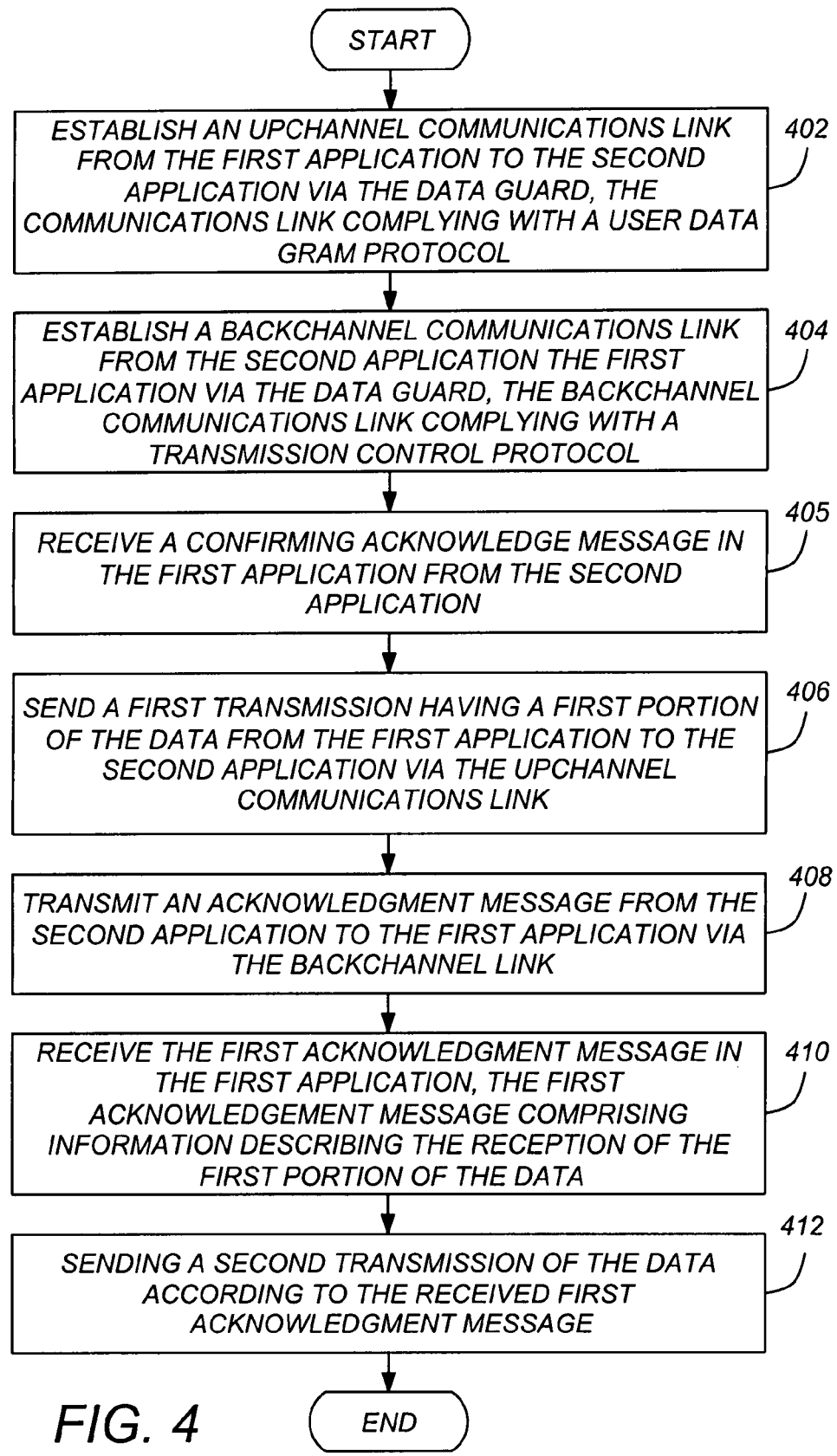
FIG. 4 is a flow chart showing exemplary method steps for transferring data from one security domain to another of a higher classification level.

FIG. 4 is a flow chart describing exemplary processes by which information may be securely transmitted. In step 402, an upchannel communications link 314 is established between the first application 312A and the second application 312B. In one embodiment, this step is performed by the first application 312A executing on the first computer 306A. Further, this upchannel communications link 314 is preferably established in a simple, one way transmission protocol.

Figure 5:
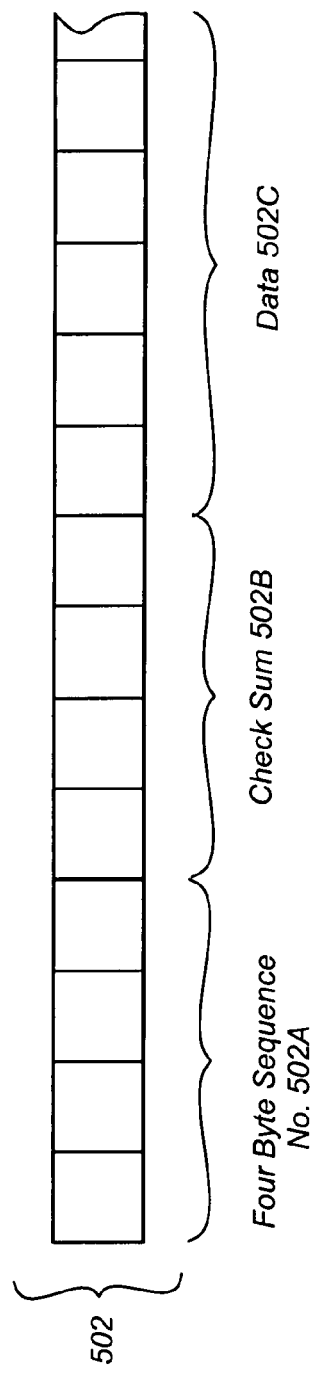
FIG. 5 is a diagram showing the protocol for an upchannel communications link.

FIG. 5 is a diagram illustrating an exemplary one-way transmission protocol suitable for the upchannel communications link. In this embodiment, the transmission protocol comprises a sequence number 502A, a check sum 502B and data 502C of a desired length.

The sequence number field 502A is a sequential message identifier that indicates the sequence number of the transmitted data packet (which is later used to identify missing packets) or to indicate if the packet is the last packet to be transmitted. This can be accomplished, for example by taking the difference between the sequence number of a current packet and subtracting the sequence number of the packet received immediately before the current packet. If the difference is greater than one, a missed packet is indicated. To account for data packets that are ultimately received, but out of sequence, the packet numbers may be stored by the receiver until the last packet is received, and missing packets determined from the stored packet numbers. In one embodiment, the sequence number is a four byte sequence unsigned integer number, with a value of 0 indicating that associated packet is the last to be transmitted, and otherwise, the sequence number of the packet.

The checksum is a field indicating the checksum over the data portion 502C of the message. In the illustrated embodiment, it is 4 bytes long. The data portion 502C can include data of any length.

In one embodiment, the protocol of the established upchannel communication link is a user datagram protocol (UDP). UDP is a protocol within the IP protocol suite that is used in place of TCP when a reliable delivery is not required. Messages having data (known as datagrams) may arrive out of order, appear duplicated, or go missing without notice. Because UDP does not check whether every packet actually arrived, it is faster and more efficient for many lightweight or time-sensitive purposes. Also, its stateless nature is useful for servers that answer small queries from huge numbers of clients. UDP is also an appropriate protocol for transmitting information from a lower classification level domain to a higher one, because the higher classification level domain merely accepts the data much as a black box, without providing any feedback to the sender. UDP is widely used for streaming audio and video, voice over IP (VoIP) and video-conferencing, and other applications where there is no time or need to retransmit erroneous or dropped packets. UDP is "connectionless" and does not use a handshake to start a session . . . it just sends out packets without regard to whether or how the data is received. This first communications link is established via the dataguard 310.

In response to the establishment of the upchannel communications link 314 (see FIG. 3), a backchannel communications link 316 is established from the second application 312B to the first application 312A via the dataguard 310. This is shown in step 404. In one embodiment, the backchannel communications link 316 is established by the second application 312B or another application operating in the secret domain 304B.

Since this backchannel communications link 316 is used to provide information regarding the data received by the second application 312B, the backchannel communications link 316 is compliant with a two-way and/or handshaking protocol.

Figure 6:
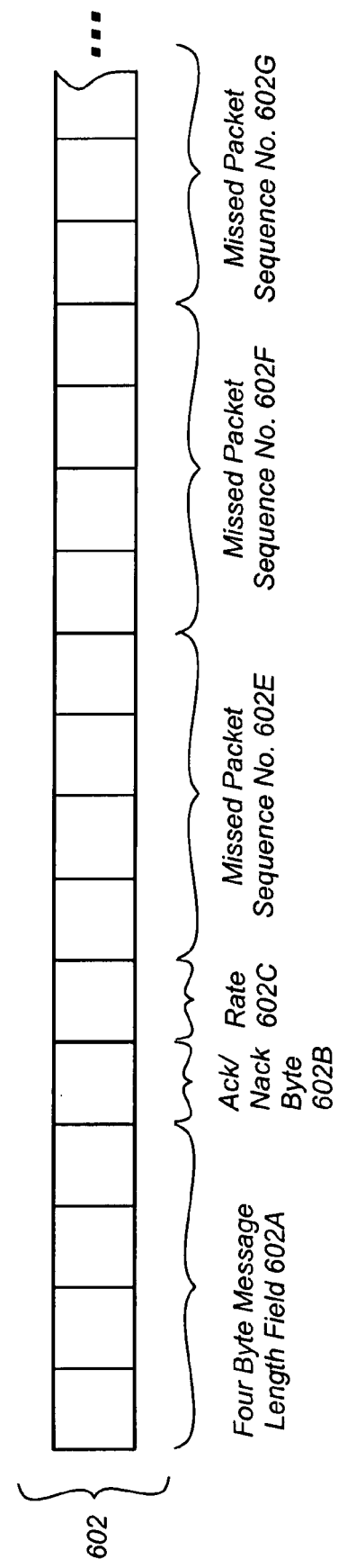
FIG. 6 is a diagram showing the protocol for the backchannel communications link.

FIG. 6 is a diagram of an exemplary protocol for the backchannel communications link 316. In this protocol, messages include a message length field 602A, an acknowledge/non-acknowledge field 602B, a rate field 602C, and one or more missing packet sequence fields 602E-602G.

The message length field 602A indicates the number of bytes in the data portion of the message sent in the backchannel communications link 316. In one embodiment, this is an unsigned 32-bit integer.

The acknowledge/non-acknowledge field 602B includes information regarding the number of messages that were successfully received by the second application 312B. In one embodiment, the acknowledge/non-acknowledge field 602B includes a single byte (an 8 bit unsigned integer), and a value indicates the number of messages that were not successfully received (0 indicating that all of the previous M data packets were successfully received, and a number N indicating that N of the previous M data packets were not successfully received). The number of data packets sent in a particular burst of data, M, may be included in the protocol itself, either as a default value (e.g. each burst always includes 10 messages) or can be included in the upchannel and backchannel protocols.

The transmit rate field 602C provides an indication of the desired or preferred data transmission rate for future messages. In one embodiment, the transmission rate field is an unsigned integer K that indicates the change in transmission rate for future messages. For example, K=0 would indicate that the transmission rate should remain unchanged, K>0 would indicate that the transmission rate should be increased according to the value of K (e.g. increased more if K=5 than if K=4), and K<0 indicates that the transmission rate should be decreased according to the value of K (e.g. decreased more if K=−5 than if K=−4).

The missed packet sequence fields 602E-602G provides the sequence number (e.g. 502A in FIG. 5) of the missed packet. The maximum number of missed packet sequence number fields 602E-602G may be limited if desired.

Application 312B may transmit a confirming acknowledgement message to indicate that the backchannel communications link 316 has been established. This is shown in step 405. This message may use only the message length field 602A, the acknowledge/non-acknowledge field 602B, and the transmit rate field 602C. For example, the values of the message length field 602A, the acknowledge/non-acknowledge field 602B, and the transmit rate field 602C may be set to 6, 0, and 0, respectively. The data guard 310 then re-grades the confirming acknowledgement message and forwards it to application 312A.

Using the established upchannel communications link 314 and the protocol defined above, the first application 312A sends a first transmission of the data to the second application 312B. In the illustrated embodiment, this is accomplished via the data guard 310A.

Typically, the data to be transmitted is large enough so that it must be transmitted in a plurality of messages. In such case, the data transmitted in the foregoing step comprises a first portion of the total amount of data to be sent. In one embodiment, the number of messages that can be transmitted from the first application 312A to the second at a time is fixed by the protocol to a certain number (10, for example). However, the upchannel 314 and backchannel 316 link protocols can be defined such that this value is selectable by the user (e.g. the message length is variable and specified in the protocol used by the upchannel link 314).

After the second application 312A receives the transmitted messages having the first portion of the data, the second application 312B transmits an acknowledgement message to the first application 312A via the backchannel link 316, using the protocol described above. The acknowledgement message is transmitted via the data guard 310, which downgrades the message to a security classification matching that of the domain 304A of the first application 312A.

In the cases where number of messages per transmission is fixed (e.g. at 10), the second application 312B merely transmits an acknowledgement message to the first application 312A after the receipt of the specific number of messages (e.g. every 10 messages).

As described above, the acknowledgement message includes information describing the reception of the first portion of the data.

For example in one embodiment, if all of the messages or packets in the previous transmission were properly received by the second application 312B, there no "missed" packages to report. Therefore, fields 602E-602G are empty, the acknowledge field 602 is sent to "0" (indicating that all of the previous packets were properly received), the transmit rate byte would be set to "0" indicating that the rate should not be changed (or perhaps a larger integer, indicating that it should be increased), and since only 6 bytes are used in the message, the message length field 602A is set to "6".

Messages are considered missed or erroneously received if (1) the checksum of the message computed by the second application 312C and the checksum 502B transmitted to the second application 312C do not match and/or (2) the message is received out of sequence as indicated by the sequence number 502A. In which case, the sequence number of the missing or erroneously received messages are presented in fields 602E-602G, and the acknowledge field is set to the number of missing or erroneous messages. For example, if 2 messages are not received or erroneously received, the sequence numbers of those messages are transmitted in fields 602E and 602F, the acknowledge/non-acknowledge field (in the illustrated embodiment, a single byte) is set to "2", and the message length field 602A is set to "14". This indicates that these two packets should be resent. If desired, the rate field 602C may be set to a number less than "1" to slow the transmission rate of future transmissions.

The first application 312A receives the acknowledgement message, and sends a second message transmission and further message transmission with other portions of the data as necessary according to the information in the acknowledgement message. For example, if the acknowledge/non-acknowledge field 602B is equal to "0" (all messages properly received) and the transmit rate field is equal to "0", the first application continues to transmit messages as before. If the acknowledge/non-acknowledge field 602B is equal to "0" and the transmit rate field is greater than "0", no messages or packets need be retransmitted, and the first application 312A speeds up the transmission of future messages. If the acknowledge/non-acknowledge field 602B is equal to "0" and the transmit rate field is less than "0", no messages or packets need be retransmitted, the first application 312A slows down the transmission of future messages. If the acknowledge/non-acknowledge field 602B is greater than "0", the first application 312 retransmits the number of packets in the field 602B. The messages transmitted are the ones having the sequence number indicated in the missed packet sequence fields 602E-602G.

Hardware Environment

Figure 7:
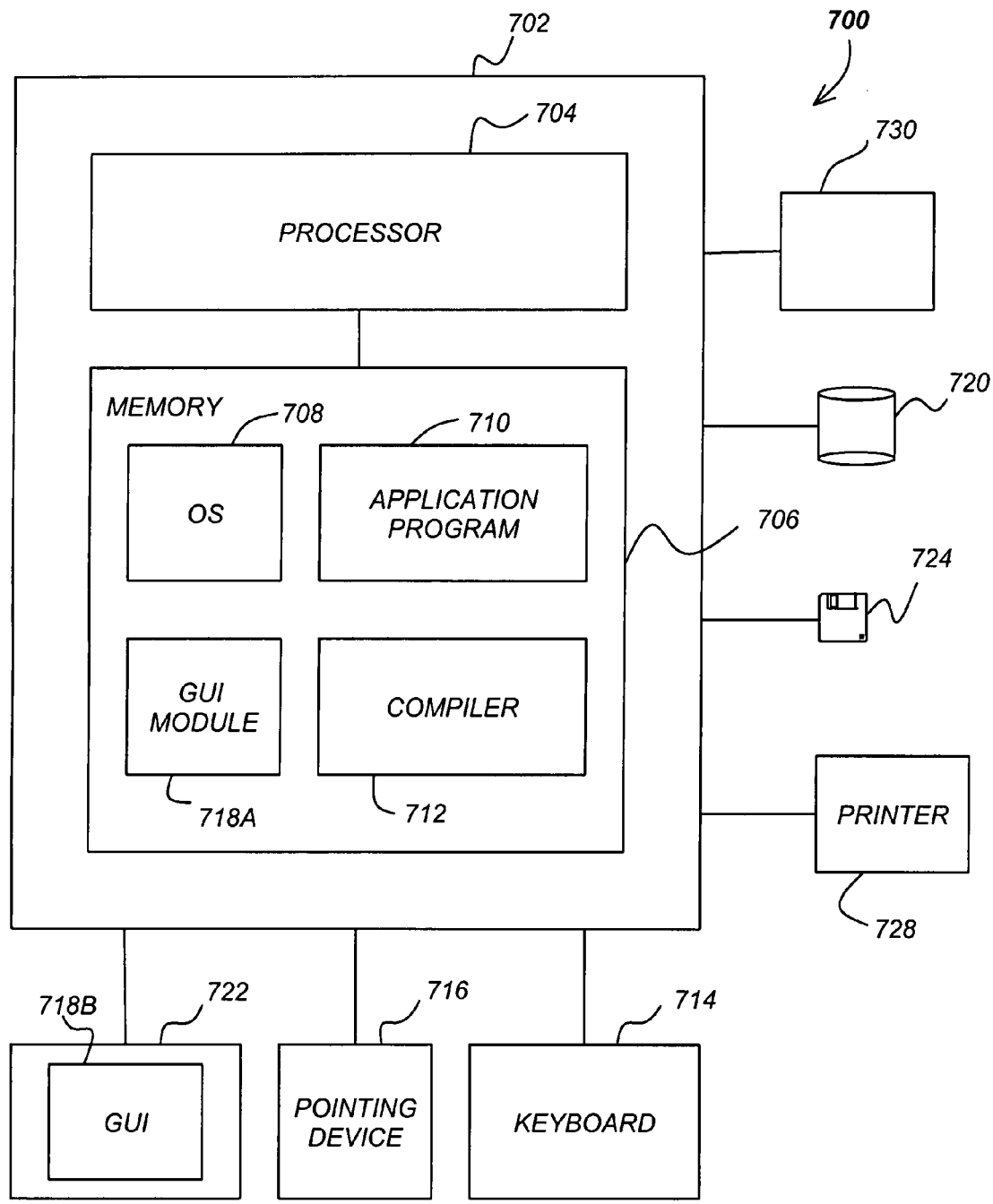
FIG. 7 is a diagram of a computer system that can be used to implement the data transfer system described herein.

FIG. 7 illustrates an exemplary computer system 700 that could be used to implement the foregoing. The computer 702 comprises a processor 704 and a memory, such as random access memory (RAM) 706. The computer 702 is operatively coupled to a display 722, which presents images such as windows to the user on a graphical user interface 718B. The computer 702 may be coupled to other devices, such as a keyboard 714, a mouse device 716, a printer, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the user to accept inputs and commands and to present results through a graphical user interface (GUI) module 718A. Although the GUI module 718A is depicted as a separate module, the instructions performing the GUI functions can be resident or distributed in the operating system 708, the computer program or application 710, or implemented with general purpose memory and processors. The computer 702 may also implement a compiler 712 which allows an application program 710 such as application programs 312A-312C written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the steps necessary to implement and/or use the foregoing system. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of passing data from a first application to a second application, comprising the steps of:

establishing, in a first computer executing the first application at a first security level, an upchannel communications link from the first application to a second application executing in a second computer at a second security level higher than the first security level via a data guard, the upchannel communications link complying with a user datagram protocol (UDP);

establishing, in the second computer, a backchannel communications link from the second application to the first application via the data guard, the backchannel communications link complying with a transmission control protocol (TCP);

sending a first transmission having a first portion of the data from the first application executing in the first computer to the second application executing in the second computer via the upchannel communications link;

transmitting an acknowledgement message from the second application executing in the second computer to the first application executing in the first computer via the backchannel link;

receiving the acknowledgement message in the first application executing in the first computer, the acknowledgement message comprising information describing the reception of the first portion of the data; and sending a second transmission of the data from the first application executing in the first computer to the second application executing in the second computer according to the received acknowledgement message.

2. The method of claim 1, wherein the first portion of the data comprises a plurality of messages and the information further comprises information indicating which messages were not received.

3. The method of claim 2, wherein each message of the plurality of messages is associated with a sequential message identifier, and the information indicating which messages were not received comprises the message identifier of the unreceived messages.

4. The method of claim 1, wherein the first portion of the data comprises a plurality of messages and the information further comprises an indication of a preferred transmission rate of further messages.

5. The method of claim 1, wherein:
the first application establishes the upchannel communications link; and
the second application establishes the backchannel communications link.

6. The method of claim 1, wherein the backchannel communications link is established in response to the establishment of the upchannel communications link.

7. The method of claim 1, wherein:
the method further comprising the step of after the establishment of the backchannel communications link, receiving a confirming acknowledgement message in the first application executing in the first computer from the second application executing in the second computer via the backchannel link; and
the first transmission is sent in response to the confirming acknowledgement message.

8. An apparatus for passing data, comprising:
a first computer, for performing processing including a first application at a first security level;
a second computer, coupled to the first computer via a data guard, the second computer for performing processing including a second application on a second security level higher than the first security level;
the first application, operating on the first computer, for establishing an upchannel communications link from the first application to the second application via the data guard, the upchannel link complying with a user datagram protocol (UDP);
the second application, operating on the second computer, for establishing a backchannel communications link from the second application to the first application via the data guard, the backchannel communications link complying with a transmission control protocol (TCP);
wherein the first application sends a first transmission having a first portion of the data to the second application via the upchannel communications link;
wherein the second application transmits an acknowledgement message to the first application via the backchannel link, the acknowledgement message comprising information describing the reception of the first portion of the data by the second application; and
wherein the first application sends a second transmission of the data according to the received acknowledgement message.

9. The apparatus of claim 8, wherein the first portion of the data comprises a plurality of messages and the information further comprises information indicating which messages were not received.

10. The apparatus of claim 9, wherein each message of the plurality of messages is associated with a message identifier, and the information indicting which messages were not received comprises the message identifier of the unreceived messages.

11. The apparatus of claim 8, wherein the first portion of the data comprises a plurality of messages and the information further comprises an indication of the preferred transmission rate of further messages.

12. The apparatus of claim 8, wherein:
the first application establishes the upchannel communications link; and
the second application establishes the backchannel communications link.

13. The apparatus of claim 8, wherein:
after the establishment of the backchannel communications link, a confirming acknowledgement message is received in the first application from the second application via the backchannel link; and
the first transmission is sent in response to the confirming acknowledgment message.

14. An apparatus for passing data from a first application to a second application, comprising:
means for establishing an upchannel communications link from a first application executing at a first security level to a second application executing at a second security level higher than the first security level via a data guard, the upchannel communications link complying with a user datagram protocol (UDP);
means for establishing a backchannel communications link from the second application to the first application via the data guard, the backchannel communications link complying with a transmission control protocol (TCP);
means for sending a first transmission having a first portion of the data from the first application to the second application via the upchannel communications link;
means for transmitting an acknowledgement message from the second application to the first application via the backchannel link;
means for receiving the acknowledgement message in the first application, the first acknowledgement message comprising information describing the reception of the first portion of the data; and
means for sending a second transmission of the data according to the received acknowledgement message.

15. The apparatus of claim 14, wherein the first portion of the data comprises a plurality of messages and the information further comprises information indicating which messages were not received.

16. The apparatus of claim 15, wherein each message of the plurality of messages is associated with a sequential message identifier, and the information indicating which messages were not received comprises the message identifier of the unreceived messages.

17. The apparatus of claim 14, wherein the first portion of the data comprises a plurality of messages and the information further comprises an indication of a preferred transmission rate of further messages.

18. The apparatus of claim 14, wherein:
the first application establishes the upchannel communications link; and the second application establishes the backchannel communications link.

19. The apparatus of claim 14, wherein the backchannel communications link is established in response to the establishment of the upchannel communications link.

20. The apparatus of claim 14, wherein:
   the apparatus further comprises means for receiving a confirming acknowledgement message in the first application from the second application via the backchannel link after the establishment of the backchannel communications link; and the first transmission is sent in response to the confirming acknowledgement message.

* * * * *